(12) United States Patent
Bok et al.

(10) Patent No.: US 11,975,684 B2
(45) Date of Patent: May 7, 2024

(54) SYSTEM FOR MANAGING A SEAT OCCUPANCY STATUS BY A PASSENGER AND A METHOD FOR CONTROLLING THE SAME

(71) Applicants: HYUNDAI MOTOR COMPANY, Seoul (KR); KIA CORPORATION, Seoul (KR); SAMSONG INDUSTRIES, LTD., Seoul (KR)

(72) Inventors: Chang Kyu Bok, Seoul (KR); Dong Ryul Shin, Busan (KR); Su Cheon Kim, Incheon (KR); Yong Chan Yoon, Seoul (KR); Man Seok Kim, Changwon-si (KR)

(73) Assignees: HYUNDAI MOTOR COMPANY, Seoul (KR); KIA CORPORATION, Seoul (KR); SAMSONG INDUSTRIES, LTD., Seoul (KR)

( * ) Notice: Subject to any disclaimer, the term of this patent is extended or adjusted under 35 U.S.C. 154(b) by 0 days.

(21) Appl. No.: 17/890,665

(22) Filed: Aug. 18, 2022

(65) Prior Publication Data
US 2023/0226996 A1    Jul. 20, 2023

(30) Foreign Application Priority Data
Jan. 19, 2022    (KR) .......................... 10-2022-0008022

(51) Int. Cl.
*B60R 22/48*    (2006.01)
*B60R 16/023*    (2006.01)
*B60R 16/033*    (2006.01)

(52) U.S. Cl.
CPC ............ *B60R 22/48* (2013.01); *B60R 16/023* (2013.01); *B60R 16/033* (2013.01);
(Continued)

(58) Field of Classification Search
CPC ..... B60R 22/48; B60R 16/023; B60R 16/033; B60R 2022/4816; B60R 2022/4858;
(Continued)

(56) References Cited

U.S. PATENT DOCUMENTS 3,860,904 A * 1/1975 Andersen ................ B60R 22/48
340/687
6,356,194 B1 * 3/2002 Fukui ................ B60R 21/01566
280/730.2
(Continued)

FOREIGN PATENT DOCUMENTS

JP    2019-001365 A    1/2019
JP    2019043451 A    3/2019

*Primary Examiner* — Ryan W Sherwin
(74) *Attorney, Agent, or Firm* — MCDONNELL BOEHNEN HULBERT & BERGHOFF LLP

(57) ABSTRACT

A system for managing a seat occupancy status by a passenger and a control method of the system includes a seat belt sensor provided for each seat to detect a fastening or unfastening of the seat belt, a pressure detection unit provided for each seat to detect occupancy or non-occupancy of a seat by a passenger and pressure of the seated passenger, a secondary control unit provided for each seat and woken up by radio communication with a vehicle to alert to an unfastened state of the seat belt when the seat belt is unfastened upon determining, by a seat belt sensor, whether the seat belt is fastened, and a primary control unit provided in the vehicle to perform radio communications with each secondary control unit and check an abnormality based on reception or non-reception of the system data transmitted from the secondary control unit.

14 Claims, 9 Drawing Sheets

(52) U.S. Cl.
CPC .......... *B60R 2022/4816* (2013.01); *B60R 2022/4858* (2013.01); *B60R 2022/4866* (2013.01)

(58) Field of Classification Search
CPC ...... B60R 2022/4866; B60R 21/01546; B60R 2021/01088; B60R 2022/4808; B60N 2/002; H02N 2/18
See application file for complete search history.

(56) References Cited

U.S. PATENT DOCUMENTS

| | | | |
|---|---|---|---|
| 10,391,972 B1* | 8/2019 | Chengalva | B64D 11/062 |
| 2005/0061568 A1 | 3/2005 | Schondorf et al. | |
| 2006/0208169 A1* | 9/2006 | Breed | G01S 17/88 |
| | | | 250/221 |
| 2007/0096891 A1* | 5/2007 | Sheriff | B60N 2/002 |
| | | | 297/464 |
| 2007/0241545 A1* | 10/2007 | Federspiel | B60R 21/01526 |
| | | | 280/735 |
| 2010/0013622 A1* | 1/2010 | Rumps | A44B 11/2565 |
| | | | 340/457.1 |
| 2013/0300555 A1* | 11/2013 | Sickon | B60R 22/48 |
| | | | 340/457.1 |
| 2016/0288732 A1* | 10/2016 | Schmotzer | B60R 22/48 |
| 2018/0265215 A1* | 9/2018 | Pollard | B64D 11/062 |
| 2019/0256041 A1 | 8/2019 | Tinoco et al. | |
| 2020/0334453 A1* | 10/2020 | Thomas | B60R 21/01526 |
| 2022/0204044 A1* | 6/2022 | Iida | G06F 11/2038 |

* cited by examiner

FIG. 4A

| door status(LF) | seat belt fastening status | warning light |
|---|---|---|
| Open | ON | OFF |
| Open | OFF | OFF |
| Close | ON | OFF |
| Close | OFF | ON |

FIG. 4B

| warning light signal | pressure detection unit | seat belt fastening status | warning light |
|---|---|---|---|
| OFF | ON | ON | OFF |
| ON | ON | OFF | BLINKING |
| OFF | OFF | ON | OFF |
| OFF | OFF | OFF | OFF |

SYSTEM FOR MANAGING A SEAT OCCUPANCY STATUS BY A PASSENGER AND A METHOD FOR CONTROLLING THE SAME

CROSS REFERENCE TO RELATED APPLICATIONS

The present application claims priority to Korean Patent Application No. 10-2022-0008022, filed Jan. 19, 2022, the entire contents of which is incorporated herein for all purposes by this reference.

BACKGROUND

Field

The present disclosure relates to a system for managing a seat occupancy status by a passenger and a control method of the management system configured to obtain electric power needed for radio communication through energy harvesting while connecting a control unit provided for each seat to a vehicle by radio and turning off the power when radio communication is not needed to reduce battery consumption at the same time.

Description of the Related Art

A seat belt reminder (SBR) is a device that induces the fastening of the seat belt by activating a warning light or an alarm when a passenger seated in a seat does not fasten a seat belt while the vehicle travels at a predetermined speed or higher.

In the seat belt reminder, a buckle and an integrated central control unit ICU are electrically connected to each other through wiring so that a buckle fastening signal is transmitted to the ICU when the seatbelt is fastened to the buckle and the ICU is connected to a vehicle controller by communication reports whether the seat belt is fastened.

On the other hand, a seat belt reminder sensor in a vehicle seat and seat belt sensors are connected to an ICU control unit through wiring in the conventional seat belt reminder.

As the number of various sensors recently increases in addition to the seat belt reminder sensor and the seat belt sensors, the length, weight, and cost of the wire of the sensors so that a problem of wiring processing arises.

In particular, the increase in the number of electric sensors in the vehicle seat keeps the various sensors and the ECU that controls the sensors in a turned-on state all the time so that a problem of increased battery consumption of the vehicle arises.

In addition, when a passenger does not fasten the seat belt in the seats other than the driver's seat, only the driver may conventionally check the alert to the unfastened seat belt through an instrument cluster so that there is a difficulty in directly alerting the passenger in a rear seat to the unfastened state of the seat belt.

The matters described above as a background of the present disclosure are intended only for a better understanding of the background of the present disclosure and are not to be taken as acknowledgment that they pertain to the conventional art already known to those skilled in the art.

SUMMARY

An object of the present disclosure is to provide a system for managing a seat occupancy status by a passenger and a control method of the management system configured to obtain the electric power needed for radio communication through energy harvesting while connecting a control unit provided for each seat to a vehicle by radio and turn off the power of the control unit when radio communication is not needed to reduce battery consumption at the same time.

In addition, another object of the present disclosure is to provide a system for managing a seat occupancy status by a passenger and a control method of the management system configured to individually alert the passenger seated in a seat to the unfastened state of a seat belt, thus improving the effect of inducing the passenger to fasten the seat belt.

According to the present disclosure, a system for managing a seat occupancy status by a passenger includes: a seat belt sensor provided for each seat to detect fastening or unfastening of the seat belt; a pressure detection unit provided for each seat to detect occupancy or non-occupancy of the seat by a passenger and the pressure of the seated passenger; a secondary control unit provided for each seat and woken up through radio communication with the vehicle to alert to an unfastened state of the seat belt when the seat belt is unfastened upon determining, through the seat belt sensor, whether the seat belt is fastened, harvesting the electric energy to which the pressure of the seated passenger detected by the pressure detection unit is converted, transmitting system data of the secondary control unit through radio communication, and switching to a sleep state after transmitting the system data; and a primary control unit provided in the vehicle to perform radio communications with each secondary control unit and check an abnormality based on reception or non-reception of the system data transmitted from the secondary control unit.

When the seat belt is unfastened, a warning light may be operated on the buckle for alerting.

The warning light may be turned on when the seat belt remains unfastened and the warning light may be turned off when the seat belt is fastened while the door is closed, and the warning light may be turned off whether or not the seat belt is fastened while the door is open.

The warning light may blink when the ignition is turned on and the seat belt remains unfastened while the passenger is seated.

The pressure detection unit may include a detection switch detecting occupancy or non-occupancy by a passenger using the pressure of the passenger seated in the seat and a piezoelectric element converting the pressure of the passenger seated in the seat into electric energy, wherein the electric energy converted into through the piezoelectric element may be stored in a battery by a harvesting circuit.

The piezoelectric element and the detection switch may be arranged close to or adjacent to each other in a region in which the load of the passenger is concentrated.

The piezoelectric element and the detection switch may be arranged to vertically overlap each other in a region in which the load of the passenger is concentrated.

The secondary control unit may switch to a wake-up state upon receiving a wake-up signal in the sleep state of the secondary control unit.

The wake-up signal may be one or more signals reflecting the ignition of the vehicle, the seat occupancy status, the seat belt fastening status, and the preset timer cycle.

The secondary control unit may be initialized immediately after the secondary control unit wakes up, and each secondary control unit may transmit system data when the initialization is successful.

The system data may be data relating to the seat belt fastening status, an alerting status to an unfastened seat belt, the seat occupancy status, a battery state, and the failure status of the secondary control unit.

When the primary control unit does not receive the system data normally, the secondary control unit may retransmit the status information data, and when a number of retransmissions exceeds a predetermined number, the secondary control unit may switch to the sleep state.

When the primary control unit receives the system data normally, the secondary control unit may switch to the sleep state.

When the primary control unit normally receives the status information data transmitted by radio from the secondary control unit and the wake-up signal that woke up the secondary control unit is a wake-up signal reflecting the ignition status of the vehicle or the seat belt fastening status, the secondary control unit may switch to the sleep state after a predetermined period after receiving the system data.

The control method of the system for managing a seat occupancy status by a passenger includes: waking up the secondary control unit through radio communication of a vehicle in the sleep state of the secondary control unit; visually alerting, by the secondary control unit, to an unfastened state of the seat belt when the seat belt is unfastened upon determining, through the seat belt sensor provided for each seat, whether the seat belt is fastened and harvesting the electric energy to which the pressure of a seated passenger detected by the pressure detection unit provided for each seat is converted; transmitting, by each secondary control unit, system data of the secondary control unit through radio communication; receiving, by a primary control unit, the system data transmitted by radio from each secondary control unit and checking an abnormality based on reception or non-reception of the system data; and switching the secondary control unit to a sleep state after transmitting the system data.

According to an aspect of the present disclosure, a secondary control unit is provided for each seat and one primary control unit is provided in the vehicle such that the secondary control unit and the primary control unit are connected by radio, and each secondary control unit converts the pressure of the passenger seated in each seat into electric energy to produce electric power which is used in the radio communication between the secondary control unit and the primary control unit so that there is an advantage of stably obtaining electric power needed for radio communication.

In addition, the secondary control unit switches to the sleep state after radio communication between the secondary control unit and the primary control unit is completed so that the power flowing into the secondary control unit is cut off while the radio communication is not in use, thus reducing consumption of the battery.

In addition, passengers in the rear seat as well as in the driver's seat are individually alerted to the unfastened state of the seat belt through a warning light so that the effect of inducing the seat belt fastening is improved.

BRIEF DESCRIPTION OF THE FIGURES

FIGS. 4A and 4B are views for describing on/off operations of a warning light with respect to door status and seat occupancy status by a passenger according to the present disclosure.

DETAILED DESCRIPTION

Figure 1:
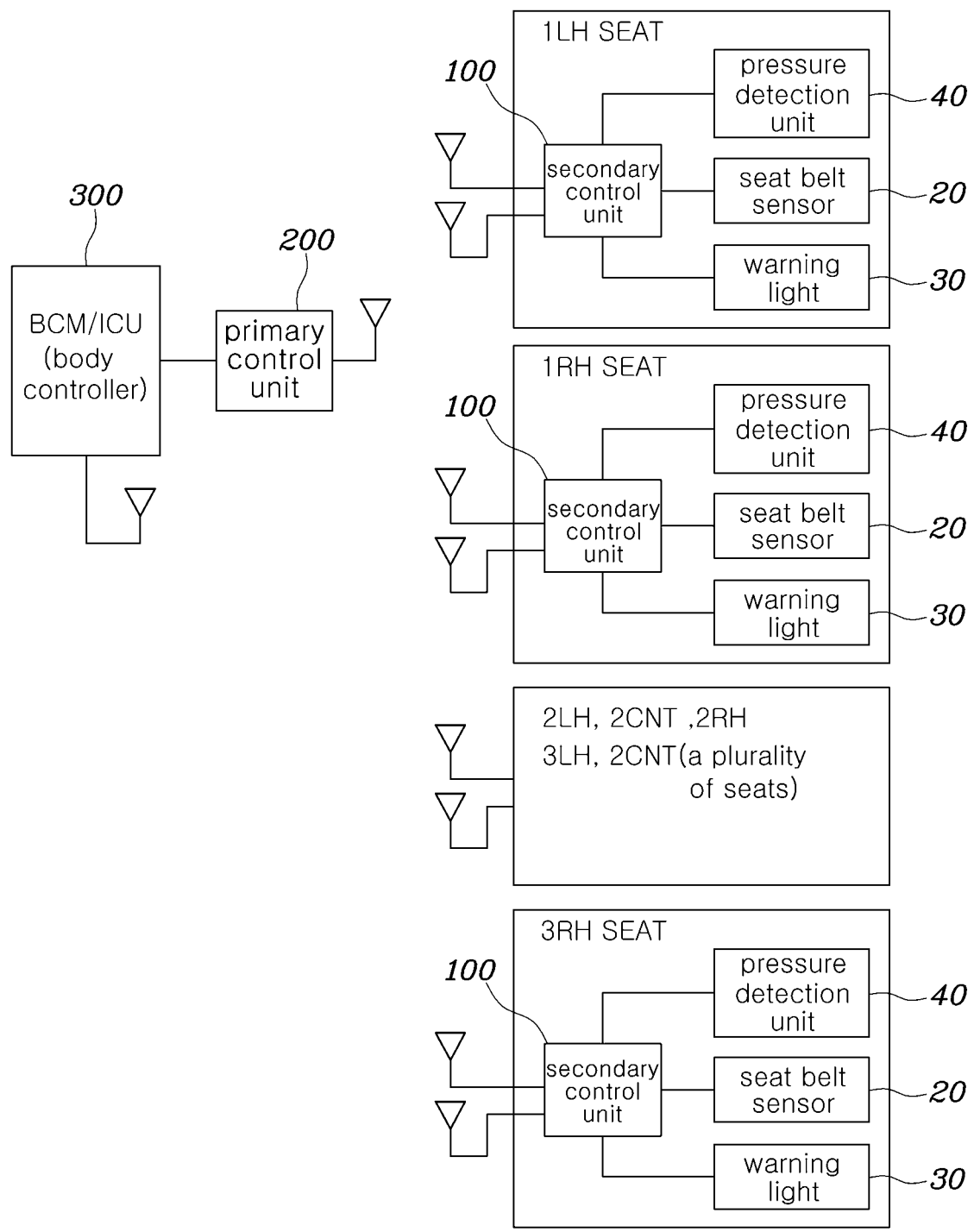
FIG. 1 is a schematic view illustrating a configuration of a system for managing a seat occupancy status by a passenger according to the present disclosure.

The specific structural or functional descriptions of the embodiments disclosed in the present specification or application are merely exemplified for the purpose of describing the embodiments according to the present disclosure. The embodiments of the present disclosure may be implemented in various forms, and the present disclosure is not to be interpreted as being limited to the embodiments described in the present specification or application.

According to the present disclosure, the embodiment may be subject to various modifications and have various forms so that specific embodiments will be illustrated in the drawings and described in detail in the present specification or application. It is to be understood that this is not intended to limit the embodiments according to the concept of the present disclosure to the specific disclosed forms and that all modifications, equivalents, and substitutes within the spirit and technical scope of the present disclosure are included.

Terms such as first, second, etc. may be used to describe various components, but the components are not to be limited by the terms. The terms may only be used for the purpose of distinguishing one component from another. For example, without departing from the scope of the present disclosure, a first component may be denoted as a second component, and similarly, a second component may also be denoted as a first component.

When a component is referred to as being "connected" or "coupled" to another component, the component may be directly connected or coupled to the another component, but it is to be understood that other components may exist in between. On the other hand, when a component is referred to as being "directly connected" or "directly coupled" to another component, it is to be understood that there are no intervening components present. Other expressions describing a relationship between components, that is, "between", "just between", "neighboring", and "directly neighboring" are to be interpreted in the same manner.

The terms used herein are used for the purpose of describing specific embodiments only and are not intended to limit the disclosure. Singular expressions include plural expressions unless the context explicitly indicates otherwise. In the present specification, terms such as "comprise" or "have" are intended to designate the presence of implemented features, numbers, steps, operations, components, parts, or combinations thereof described in the specification and are not to be understood to preclude the presence or additional possibilities of one or more of other features, numbers, steps, operations, components, parts, or combinations thereof in advance.

Unless otherwise defined, all terms used herein, including technical or scientific terms, may have the same meanings as are generally understood by those skilled in the art to which the present disclosure pertains. The terms such as those defined in commonly used dictionaries are to be interpreted as having meanings consistent with their meanings in the context of the related technology and are not to be interpreted in an idealized or overly formal sense unless expressly so defined herein.

Preferred embodiments of the present disclosure will be described in detail with reference to the accompanying drawings in the following.

Figure 2:
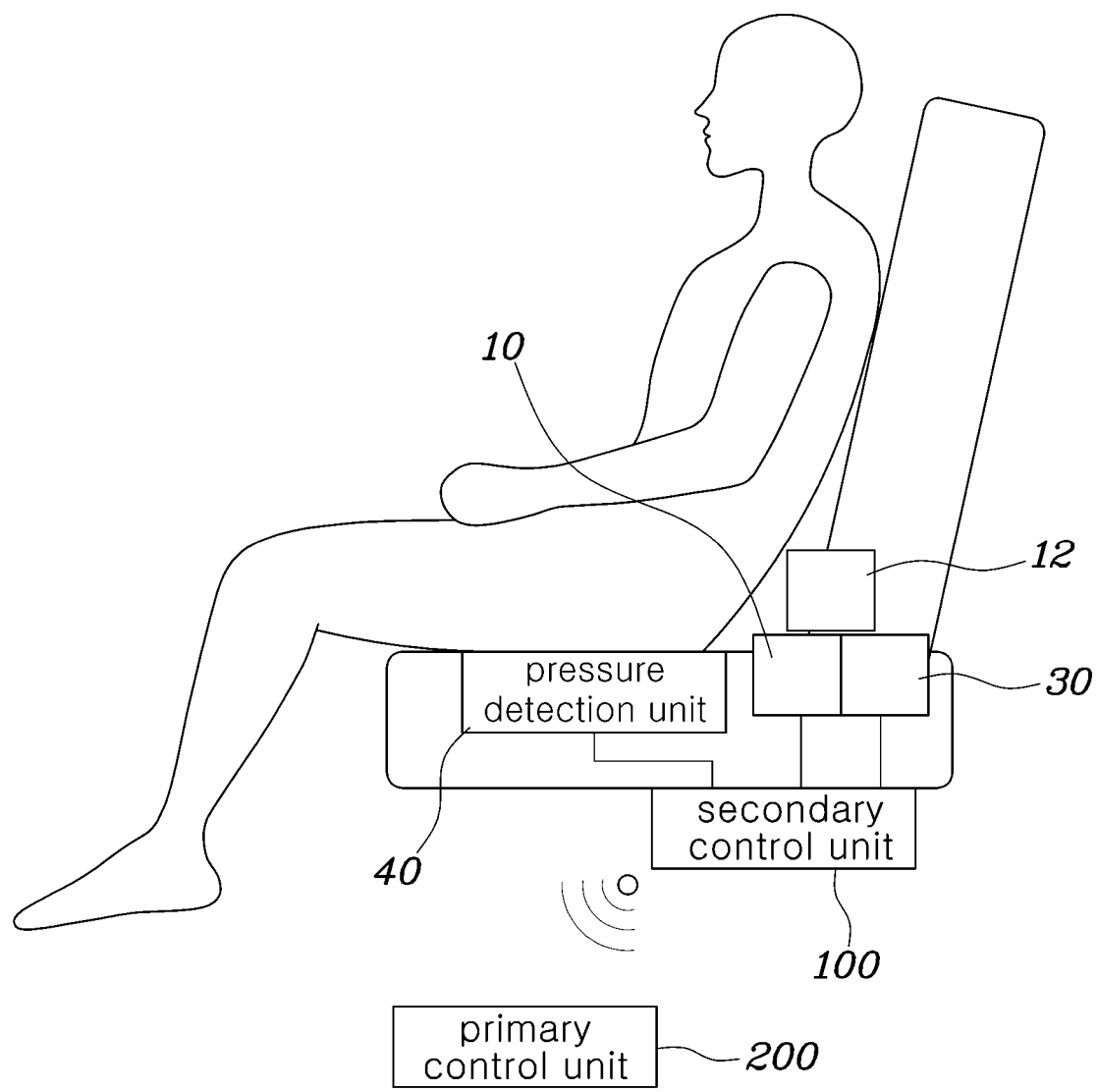
FIG. 2 is a schematic view illustrating an arrangement relationship between a seat belt sensor, a pressure detection unit, and a secondary control unit installed in a seat according to the present disclosure.
Figure 3:
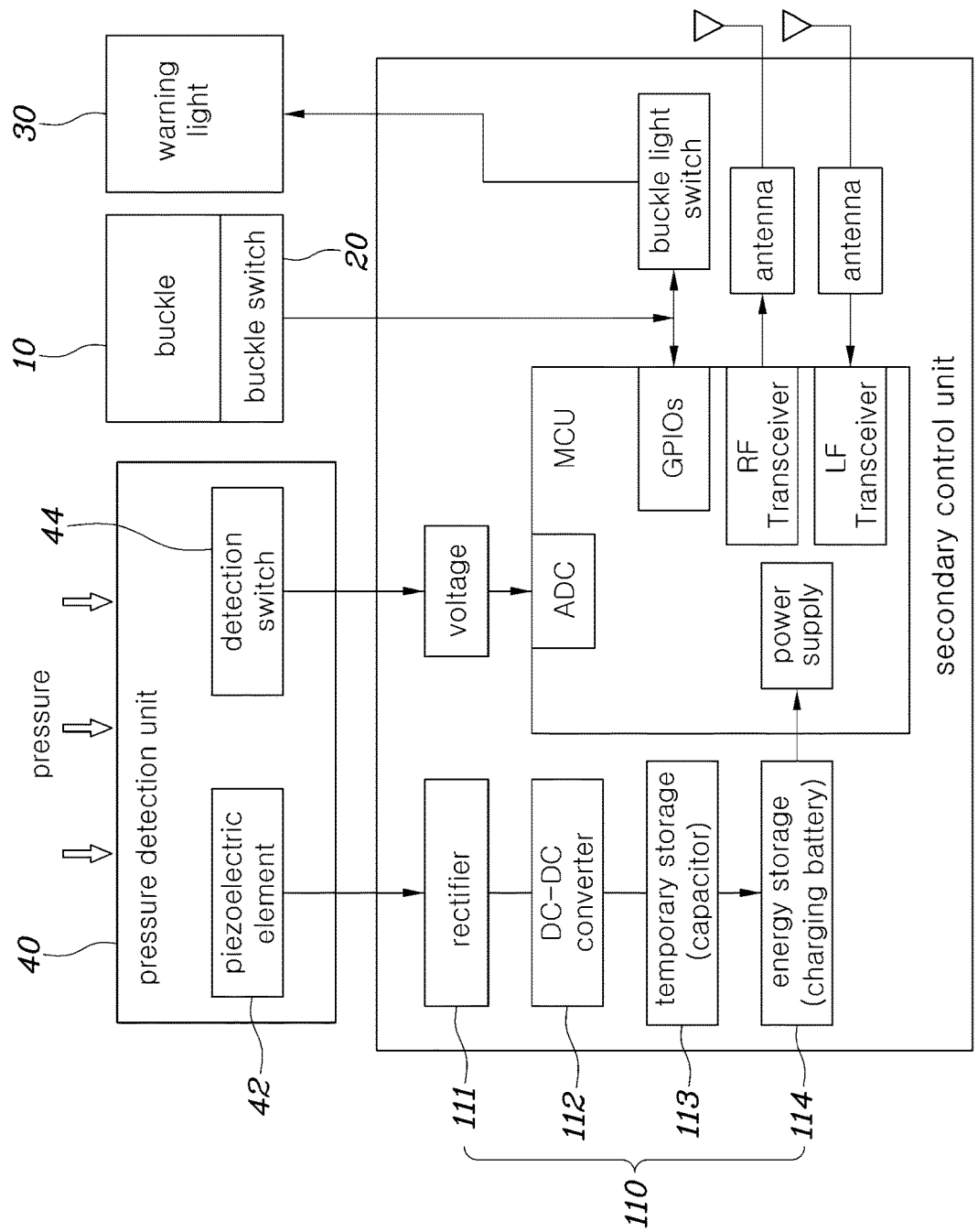
FIG. 3 is a view illustrating a configuration of a secondary control unit according to the present disclosure.

FIG. 1 is a schematic view illustrating a configuration of a system for managing a seat occupancy status by a passenger according to the present disclosure, FIG. 2 is a schematic view illustrating an arrangement relationship between a seat belt sensor 20, a pressure detection unit 40, and a secondary control unit 100 installed in a seat according to the present disclosure, and FIG. 3 is a view illustrating a configuration of a secondary control unit 100 according to the present disclosure.

FIGS. 1 to 3 show that, according to the present disclosure, a system for managing a seat occupancy status by a passenger includes: a seat belt sensor 20 provided for each seat to detect fastening or unfastening of the seat belt; a pressure detection unit 40 provided for each seat to detect occupancy or non-occupancy of the seat by a passenger and pressure of the seated passenger; a secondary control unit 100 provided for each seat and woken up by radio communication with the vehicle to visually alert to an unfastened state of the seat belt when the seat belt is unfastened upon determining, through the seat belt sensor 20, whether the seat belt is unfastened, harvest electric energy to which pressure of a seated passenger detected by the pressure detection unit 40 is converted, transmit system data of the secondary control unit 100 through radio communication, and switch to a sleep state after transmitting the system data; and a primary control unit 200 provided in the vehicle to perform radio communications with each secondary control unit 100 and check an abnormality based on reception or non-reception of the system data transmitted by radio from the secondary control unit 100.

For example, the seat belt sensor 20 is a sensor detecting a seat belt fastening status, and a buckle switch may be used.

The buckle switch is turned on and off depending on/whether a tongue 12 of a buckle 10 is fastened so that the seat belt fastening status may be detected.

Another embodiment of the seat belt sensor 20 may include a contact switch, a Hall sensor, a resistance sensor, a vision sensor, and the like.

An automatic locking retractor (ALR) may be further included in addition to the seat belt sensor 20, and whether a car seat is mounted may be determined based on the detection result of the ALR sensor and the pressure detection unit 40.

In addition, a buckle tension sensor BTS may be further included, and whether a car seat is mounted may be determined based on the detection result of the BTS sensor and the pressure detection unit 40.

In addition, the pressure detection unit 40 may be provided in a seat cushion on which the passenger is seated, determines whether a passenger is seated by sensing the pressure of the passenger seated in a seat, and detects the pressure generated by the movements of the passenger.

In addition, the secondary control unit 100 switches from the sleep state to a wake-up state upon receiving a wake-up signal transmitted by radio from the vehicle.

Whether a seat belt is fastened may be determined through the seat belt sensor 20, and a warning light 30 installed in the seat may be operated when the seat belt is unfastened.

In addition, the secondary control unit 100 may be configured to detect the pressure of the passenger through the pressure detection unit 40 and implement a harvesting function by which the detected pressure is converted into electric energy to produce the electric power.

In addition, each secondary control unit 100 transmits to the primary control unit 200 the system data relating to the seat belt fastening status in the seat, an alerting status to an unfastened seat belt, the seat occupancy status, a battery 114 state, and failure status of the secondary control unit 100 and switches to the sleep state after the transmission is completed.

Here, the sleep state is a state in which the secondary control unit 100 does not operate and refers to a state in which all power supplied to the secondary control unit 100 is cut off.

The primary control unit 200 receives the system data transmitted by radio from each secondary control unit 100 and checks an abnormality such as failure of the secondary control unit 100, failure of transmission and reception, battery 114 shortage, and the like.

Bluetooth low energy BLE of RF 2.4 GHz may be used in the radio transmission and reception between the primary control unit 200 and the secondary control unit 100 through the RF transceiver and RF receiver provided in the primary control unit 200 and the secondary control unit 100, but low-power RF (315, 433, 425~435 MHz) of other bands may be used.

That is, according to the present disclosure, a secondary control unit 100 is provided for each seat and one primary control unit 200 is provided in the vehicle such that the secondary control unit and the primary control unit are connected to each other by radio. Each secondary control unit 100 converts the pressure of the passenger seated in each seat into electric energy to produce electric power which is used in the radio communication between the secondary control unit 100 and the primary control unit 200 so that the electric power needed for the radio communication is stably obtained.

In addition, the secondary control unit 100 switches to the sleep state after the radio communication between the secondary control unit 100 and the primary control unit 200 is completed so that the power flowing into the secondary control unit 100 is cut off while the radio communication is not in use, thus greatly reducing consumption of the battery 114.

In addition, passengers in the rear seat as well as in the driver's seat are individually alerted to the unfastened state of the seat belt so that the effect of inducing the seat belt fastening is improved.

For reference, according to an embodiment of the present disclosure, the control unit may be implemented through a processor (not shown) configured to perform operations to be described below using nonvolatile memory (not shown) configured to store algorithm configured to control operations of various components of a vehicle or data relating to the software commands for playing the algorithm or data stored in the corresponding memory. Here, the memory or the processor may be implemented as separate chips. Alternatively, the memory and the processor may be implemented as a single integrated chip. The processor may take the form of one or more processors.

On the other hand, the method of visually alerting to the unfastened state of the seat belt when the seat belt is unfastened may include alerting by turning on a warning light 30 in the buckle 10 or alerting by sounding an alarm.

For example, in the configuration of the warning light 30, a buckle light switch operating the warning light 30 and a buckle switch operating when a tongue 12 is fastened are provided and the illuminating warning light 30 such as an LED is mounted in the buckle 10.

When the tongue 12 remains unfastened in the buckle 10, operating the warning light 30 installed in the buckle 10 facilitates the fastening of the seat belt in a dark environment and induces the fastening of the seat belt.

Other examples of devices alerting to the unfastened state of the seat belt are a warning device mounted inside the seat, sound (alarm, warning voice), tactile sensation (seat vibration, seat belt vibration), and the like that may be used in alerting to the unfastened state of the seat belt.

In addition, as illustrated in FIG. 1, the warning light 30 is turned on when the seat belt remains unfastened and the warning light 30 is turned off when the seat belt is fastened while the door is closed, and the warning light 30 is turned off whether or not the seat belt is fastened while the door is open.

That is, when the car door is closed, the warning light 30 is turned on to induce seat belt fastening.

If an alarm is installed, the alarm is turned on when the seat belt remains unfastened and is turned off when the seat belt is fastened while the door is closed, and the alarm is turned off whether or not the seat belt is fastened while the door is open.

In addition, as illustrated in FIG. 2, the warning light 30 may be configured to blink when the ignition is turned on and the seat belt remains unfastened while the passenger is seated. Of course, the alarm may be configured to operate at a predetermined cycle.

However, when the ignition is turned on, the warning light 30 is turned off while the passenger is not seated, and the warning light 30 is turned off when the seat belt is fastened while the passenger is seated.

When the ignition is turned on and the seat belt is fastened without a passenger in the seat, the warning light 30 is not turned on.

FIG. 3 is a view illustrating a configuration of the secondary control unit 100 according to the present disclosure.

FIG. 3 shows that the pressure detection unit 40 may include a detection switch 44 detecting seating of the passenger using the pressure of the seated passenger and a piezoelectric element 42 converting the pressure of the passenger seated in the seat into electric energy, and the electric energy converted into through the piezoelectric element 42 may be stored in the battery 114 by a harvesting circuit 110.

For example, the piezoelectric element 42 is an element producing electric power by pressure, impact, and warpage and plays the role of producing electric power by the movements continuously generated by the vibrations of the vehicle when a passenger is seated in the seat and transmitting the electric power to the harvesting circuit 110.

In addition, the detection switch 44 is a membrane switch that is turned on and off by pressure, and whether a passenger is on board is determined by an electrical switch being turned on and off. The on/off operations of a plurality of switches contribute to the determination.

In addition, the harvesting circuit 110 serves to store in the battery 114 the electric energy generated through the piezoelectric element 42, and the AC electric energy generated through the piezoelectric element 42 is converted into a direct current through a rectifier 111.

The rectified direct current is converted to a storable voltage level through a DC-DC converter 112.

Then, the electric energy is temporarily stored using a temporary storage device 113 such as a capacitor or a supercapacitor configured to quickly store low electric power.

The electric energy stored in the temporary storage device 113 is supplied to the battery 114 to charge the battery 114.

That is, when pressure is applied to the piezoelectric element 42, electric energy is generated and the generated electric energy is stored in the battery 114 through the harvesting circuit 110 so that the power of the battery 114 is supplied to devices (seat belt sensor 20, pressure detection unit 40, warning light 30) that need power in the entire system in the secondary control unit 100.

FIGS. 4A-4B illustrate an arrangement relationship between the piezoelectric element 42 and the detection switch 44 according to a first embodiment of the present disclosure.

FIGS. 4A-4B show that the piezoelectric element 42 and the detection switch 44 may be arranged adjacent to each other in a region in which a load of a passenger is concentrated.

That is, the piezoelectric element 42 and the detection switch 44 are arranged as close as possible and the buttocks pattern of the passenger is taken into consideration as much as possible in designing the detection switch 44 so that arrangement of the piezoelectric element 42 and the detection switch 44 in the closest proximity possible has an advantage in facilitating the generation of the electric power.

The piezoelectric element 42 and the detection switch 44 are arranged on the same layer and a plurality of layers are not formed in such a structure so that the manufacturing cost may be reduced.

Figure 5:
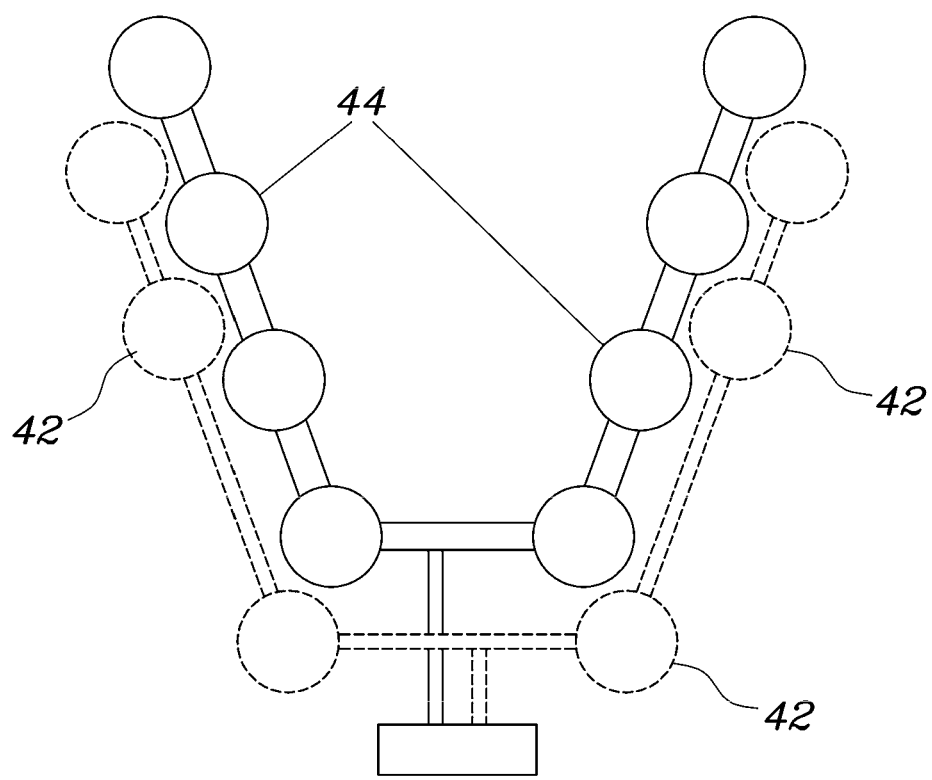
FIG. 5 is a view illustrating an arrangement relationship between piezoelectric elements and detection switches according to a first embodiment of the present disclosure.
Figure 6:
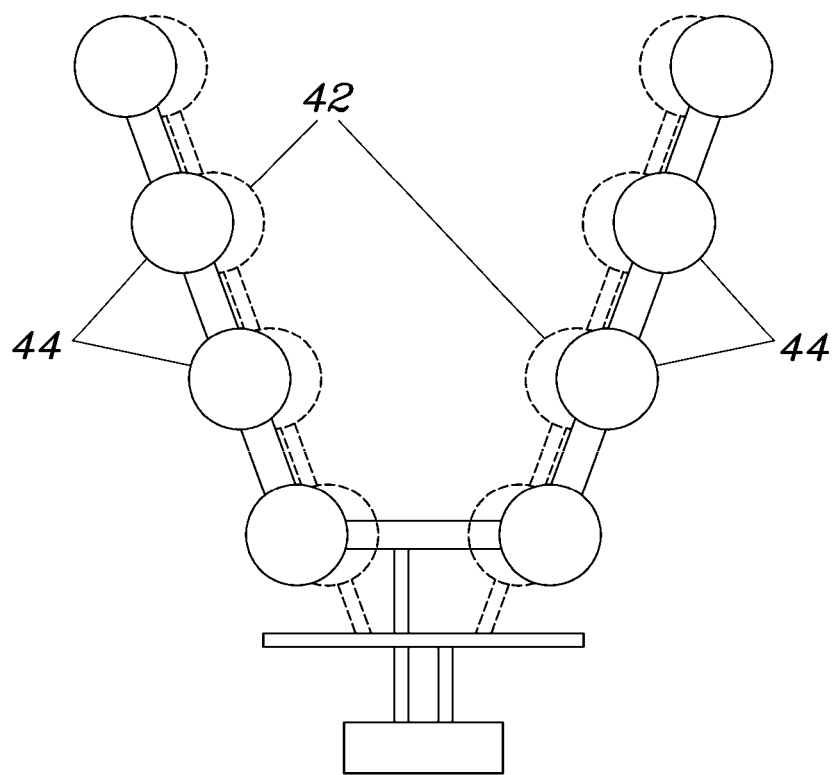
FIG. 6 is a view illustrating an arrangement relationship between piezoelectric elements and detection switches according to a second embodiment of the present disclosure.

FIG. 5 is a view illustrating an arrangement relationship between the piezoelectric element 42 and the detection switch 44 according to a second embodiment of the present disclosure.

FIG. 5 shows that the piezoelectric element 42 and the detection switch 44 may be arranged to vertically overlap each other in a region in which a load of a passenger is concentrated.

That is, the piezoelectric element 42 and the detection switch 44 form two layers such that both the piezoelectric element 42 and the detection switch 44 are subject to the pressure of the passenger's buttocks at the same positions so that the generation of the electric power through energy harvesting is maximized.

On the other hand, according to the present disclosure, the secondary control unit 100 may switch to the wake-up state upon receiving the wake-up signal in the sleep state of the secondary control unit 100.

The wake-up signal may be one or more of the signals reflecting the ignition of the vehicle, seat occupancy status, seat belt fastening status, and a preset timer cycle.

For example, when the buckle 10 switches from the fastened state to the unfastened state or switches from the unfastened state to the fastened state, the wake-up signal is received by the secondary control unit 100 so that the secondary control unit 100 wakes up.

And, when a vehicle body controller 300 senses vibrations of the vehicle through a vibration sensing means, a wake-up signal transmitted from the body controller 300 is received by the secondary control unit 100

In addition, when the ignition of the vehicle is turned on, a wake-up signal following the ignition-on is transmitted by radio and received by the secondary control unit 100.

The wake-up signal may be transmitted through a low-frequency LF (125 kHz) radio transmitter which is a low-frequency signal transmission device and may be received through an LF receiver provided in the secondary control unit 100.

In addition, when the seat occupancy is detected by the detection switch 44 provided in the pressure detection unit 40, a wake-up signal is received by the secondary control unit 100.

In addition, when the timer cycle stored in advance in the secondary control unit 100 is reached, a wake-up signal may be received. This may be a case in which the buckle 10 switches to a fastened or unfastened state or a case in which the secondary control unit 100 wakes up by the radio transmission/reception of the LF signal.

In addition, according to the present disclosure, the secondary control unit 100 is initialized after the secondary control unit 100 receives a wake-up signal, and when the initialization is successful, each secondary control unit 100 may transmit system data.

That is, when a wake-up signal is received by the secondary control unit 100, initialization is performed in the sleep state of the secondary control unit 100, and device driver, RAM inspection, flash inspection, and the like are performed through the initialization. And when the initialization of the secondary control unit 100 is successful, the secondary control unit 100 gets ready to transmit the system data.

In addition, the system data may be data relating to a seat belt fastening status, an alerting status to the unfastened seat belt, a seat occupancy status, a battery 114 state, and failure status of the secondary control unit 100.

Specifically, when the secondary control unit 100 gets ready to transmit the system data, seat belt fastening status, seat occupancy status by a passenger, battery 114 state, failure status of the secondary control unit 100 are determined. Here, determining the battery 114 state is sensing the capacity of the battery 114, and when sensing the voltage of the battery 114 indicates that the battery 114 capacity is equal to or less than the limit capacity, a signal including a warning to replace the battery 114 may be transmitted.

In addition, while the system data is ready to be transmitted, the warning light 30 may be turned on or off according to the seat belt fastening status and low-frequency LF signal (ignition signal), and the blinking of the warning light 30 may be controlled according to the seat belt fastening status and the seat occupancy status by a passenger.

In addition, electric energy is produced by the pressure applied to the piezoelectric element 42 and the produced electric energy is stored in the battery 114 so that the power of the battery 114 may be supplied to the devices that need power in the entire system in the secondary control unit 100.

In addition, the system data, which is information relating to the seat belt fastening status, the alerting status to an unfastened seat belt, the seat occupancy status, the battery 114 state, and the failure status of the secondary control unit 100, is formatted in a message packet structure for transmission through radio (RF: Bluetooth) communication.

In addition, when the primary control unit 200 fails to receive the system data normally, the secondary control unit 100 retransmits the status information data, and when the number of retransmissions exceeds a predetermined number, the secondary control unit 100 switches to the sleep state.

For example, the system data formatted in a message packet structure is transmitted by radio.

When the primary control unit 200 receives the message normally, the secondary control unit 100 receives from the primary control unit 200 a confirmation signal confirming that the message transmitted from the secondary control unit 100 is normally received.

In contrast, when the message is not normally received, the confirmation signal is not received so that the secondary control unit 100 retransmits the message when the confirmation signal is not received.

Retransmission of the message is attempted up to a predetermined number of times, and when the number of retransmissions exceeds the predetermined number, the failure of message transmission is recorded. At this time, when the message transmission of a particular secondary control unit 100 fails, the secondary control unit 100 may be diagnosed with a failure. When both the radio transmission and reception between each secondary control unit 100 and the primary control unit 200 fail, abnormal radio transmission and reception may be diagnosed.

When the number of message retransmissions exceeds a predetermined number, the secondary control unit 100 switches to the sleep state.

In addition, even when the primary control unit 200 receives the system data normally, the secondary control unit 100 switches to the sleep state.

However, when the primary control unit 200 normally receives the status information data transmitted by radio from the secondary control unit 100 and the wake-up signal that wakes up the secondary control unit 100 is a wake-up signal reflecting the ignition status of the vehicle or the seat belt fastening status, the secondary control unit 100 switches to the sleep state a predetermined period after receiving the system data.

That is, the secondary control unit 100 switches to the sleep state when the message transmission is completed or the number of message retransmissions exceeds a predetermined number so that the power flowing into the secondary control unit 100 is cut off while the radio communication is not in use, thus reducing the consumption of the battery 114.

Figure 7A:
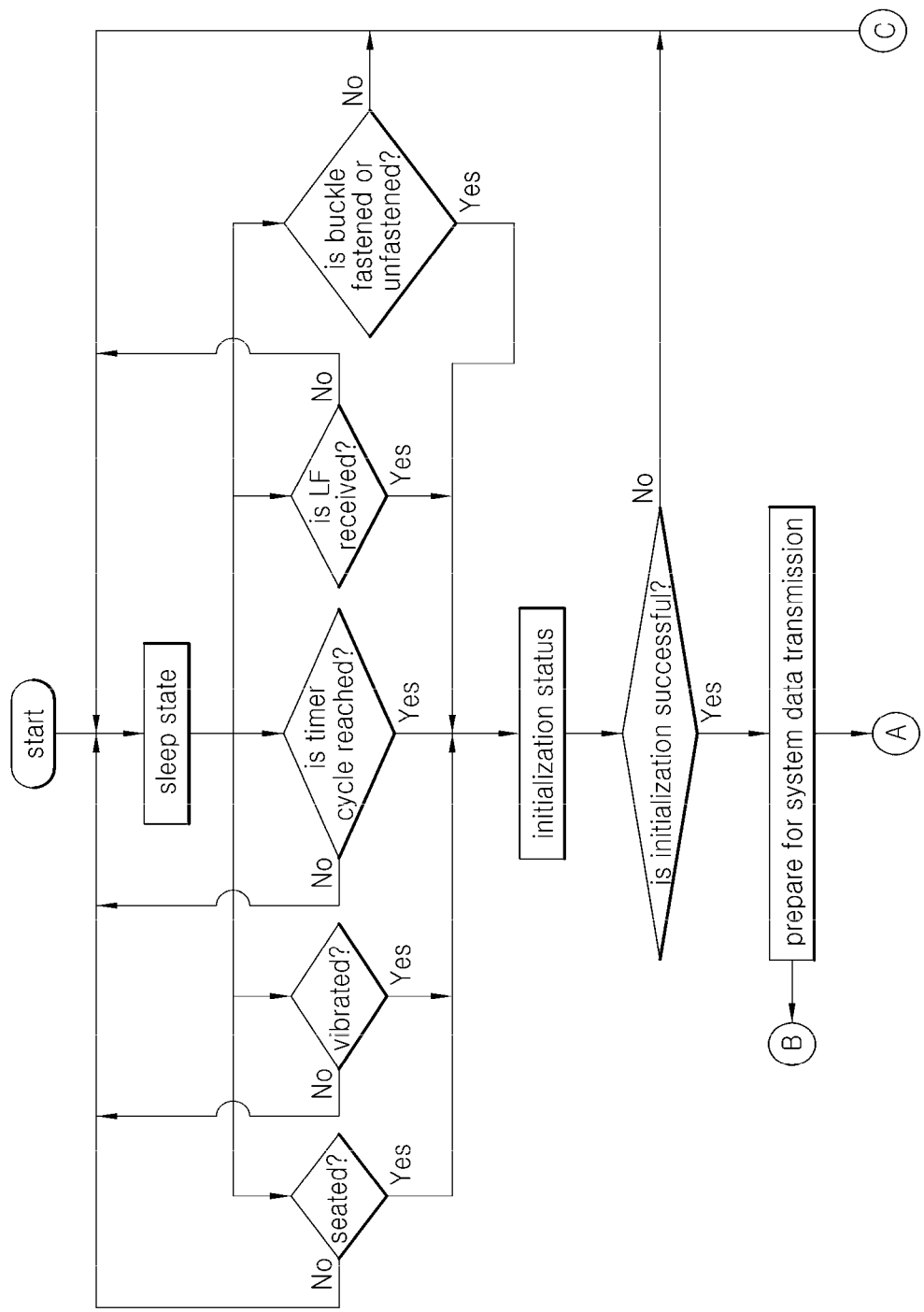
FIGS. 7A and 7B are flowcharts of control processes of a system for managing a seat occupancy status by a passenger according to the present disclosure.
Figure 7B:
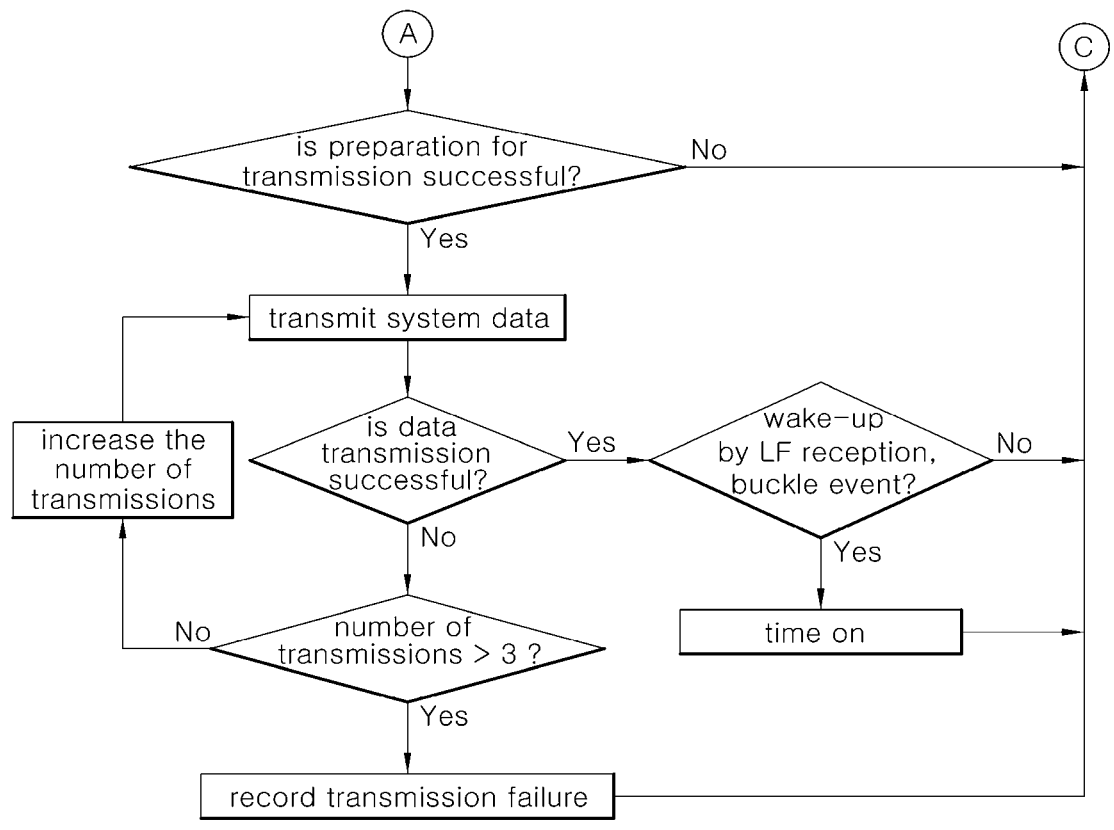
Figure 7B:
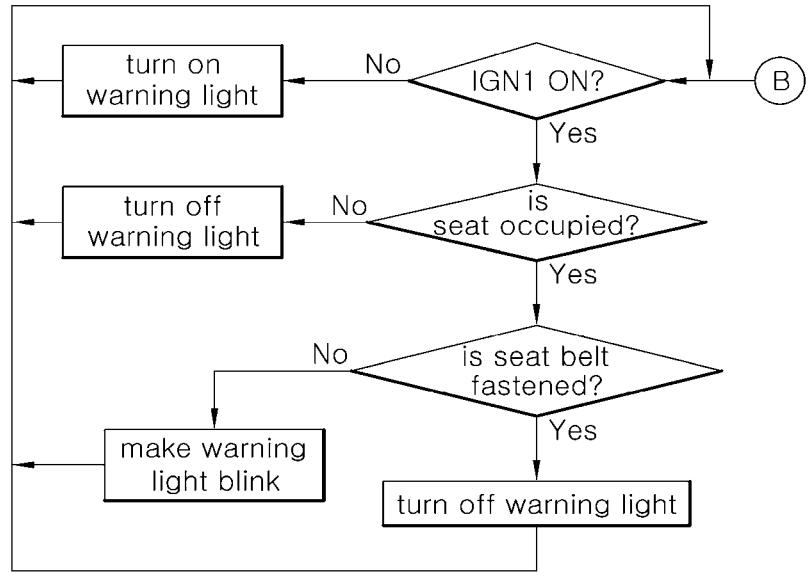

FIGS. 7A and 7B are views illustrating a control process of a system for managing a seat occupancy status by a passenger according to the present disclosure.

FIGS. 7A and 7B show that, according to the present disclosure, a control method of the system for managing a seat occupancy status by a passenger includes: waking up a secondary control unit 100 through radio communication of a vehicle in the sleep state of the secondary control unit 100; visually alerting, by the secondary control unit 100, to an unfastened state of a seat belt when the seat belt is unfastened upon determining, through a seat belt sensor 20 provided for each seat, whether the seat belt is fastened and harvesting the electric energy to which the pressure of the seated passenger detected by the pressure detection unit 40 provided for each seat is converted; transmitting, by each secondary control unit 100, system data of the secondary control unit 100 through radio communication; receiving, by a primary control unit 200, the system data transmitted by radio from each secondary control unit and checking an abnormality based on reception or non-reception of the system data; and switching the secondary control unit 100 to the sleep state after transmitting the system data.

The operation process of the system for managing a seat occupancy status by a passenger will be described with reference to FIGS. 7A and 7B in the following.

Whether a wake-up signal is received by the secondary control unit 100 while the secondary control unit 100 in the sleep state is monitored.

When a wake-up signal of the signals reflecting the ignition of the vehicle, seat occupancy status, seat belt fastening status, and preset timer cycle is received in the monitoring process, the initialization process proceeds while the secondary control unit 100 is in the sleep state.

When the initialization of the secondary control unit 100 is successful, system data of the secondary control unit 100 relating to seat belt fastening status, alerting status to an unfastened seat belt, seat occupancy status, a battery 114 state, and failure status of the secondary control unit 100 is formatted in message packet form for transmission after the initialization.

In addition, the warning light 30 may be turned on/off according to the seat belt fastening status and low-frequency LF signal (ignition signal), and the warning light 30 may blink according to the seat belt fastening status and seat occupancy status In addition, the electric energy produced by the pressure applied to the piezoelectric element 42 may be stored in the battery 114 so that power of the battery 114 may be supplied to the devices that need power in the entire system in the secondary control unit 100.

Next, when the message is ready to be transmitted, each secondary control unit 100 transmits the message, and whether the transmitted message is normally received by the primary control unit 200 is determined.

When it is determined that the data transmitted from the secondary control unit 100 is normally received by the primary control unit 200, the secondary control unit 100 receives from the primary control unit 200 a confirmation signal that the transmitted data is normally received.

Next, if the wake-up signal that causes the switching from the sleep state to the wake-up state is a wake-up signal triggered by a switching of the buckle 10 to a fastened or unfastened state or the radio transmission and reception of the LF signal, the secondary control unit 100 switches to sleep state when the timer cycle stored in the secondary control unit 100 in advance is reached or immediately switches to the sleep state otherwise.

In contrast, when the message is not normally received, the secondary control unit 100 retransmits the message.

When the message is not normally received and the number of retransmissions exceeds three, the failure of message transmission is recorded and the secondary control unit 100 switches to the sleep state.

As described above, the secondary control unit 100 is provided for each seat and one primary control unit 200 is provided in the vehicle such that the secondary control unit 100 and the primary control unit 200 are connected to each other by radio. Each secondary control unit 100 converts the pressure of the passenger seated in each seat to electric energy to produce electric power, and the produced electric power is used in the radio communication between the secondary control unit 100 and the primary control unit 200 so that the electric power needed in the radio communication is stably obtained.

In addition, the secondary control unit 100 switches to the sleep state after the radio communication between the secondary control unit 100 and the primary control unit 200 is completed so that the power flowing into the secondary control unit 100 is cut off while the radio communication is not in use, thus significantly reducing consumption of the battery 114.

In addition, the passengers seated in the rear seat as well as in the driver's seat are individually alerted to the unfastened state of the seat belt through the warning light 30 so that the effect of inducing the seat belt fastening is improved.

Only the specific embodiments of the present disclosure are described in detail, but it is obvious to those skilled in the art that various alterations and modifications are possible within the scope of the technical spirit, and such alterations and modifications fall within the scope of the accompanying claims naturally.

The invention claimed is:

1. A system for managing a seat occupancy status by a passenger, comprising:
   a seat belt sensor provided for each of a plurality of seats to detect a fastened or an unfastened state of a seat belt;
   a pressure detection unit provided for each of the plurality of seats to detect occupancy or non-occupancy of the seat by a passenger and a pressure of a seated passenger;
   a secondary control unit provided for each of the plurality of seats and woken up through radio communication with a vehicle to alert to an unfastened state of the seat belt when the seat belt is unfastened upon determining, by the seat belt sensor, whether the seat belt is fastened, wherein the secondary control unit is configured to harvest electric energy to which the pressure of the seated passenger detected by the pressure detection unit is converted, to transmit system data of the secondary control unit through radio communication, and to switch to a sleep state after transmitting the system data; and
   a primary control unit provided in the vehicle configured to perform the radio communication with each secondary control unit, and to check an abnormality based on reception or non-reception of the system data transmitted by radio from the secondary control unit, wherein the secondary control unit switches to the sleep state when the primary control unit normally receives the system data.

2. The system of claim 1, wherein a warning light is operated in a buckle or an alarm is operated to alert when the seat belt is unfastened.

3. The system of claim 2, wherein an alert is turned on when the seat belt remains unfastened and the alert is turned off when the seat belt is fastened while a door is closed, and the alert is turned off whether or not the seat belt is fastened while the door is open.

4. The system of claim 2, wherein the warning light blinks when an ignition is turned on, and the seat belt remains unfastened while a passenger is seated.

5. The system of claim 1, wherein the pressure detection unit includes:
   a detection switch configured to detect occupancy or non-occupancy of a seat by a passenger using the pressure of the passenger seated in the seat; and
   a piezoelectric element configured to convert the pressure of the passenger seated in the seat into electric energy; wherein
   the electric energy converted through the piezoelectric element is stored in a battery through a harvesting circuit.

6. The system of claim 5, wherein the piezoelectric element and the detection switch are arranged adjacent to each other in a region in which a load of the passenger is concentrated.

7. The system of claim 5, wherein the piezoelectric element and the detection switch vertically overlap each other in the region in which a load of a passenger is concentrated.

8. The system of claim 1, wherein the secondary control unit switches to the wake-up state upon receiving a wake-up signal in the sleep state of the secondary control unit.

9. The system of claim 8, wherein the wake-up signal is one or more signals reflecting an ignition of the vehicle, a seat occupancy status, a fastening status of the seat belt, and a preset timer cycle.

10. The system of claim 1, wherein the secondary control unit is initialized immediately after the secondary control unit wakes up, and each secondary control unit transmits the system data when the initialization is successful.

11. The system of claim 1, wherein the system data is data relating to a seat belt fastening status, an alerting status to an unfastened seat belt, a seat occupancy status, a battery state, and a failure status of the secondary control unit.

12. The system of claim 1, wherein when the primary control unit normally receives the status information data transmitted by radio from the secondary control unit and the wake-up signal that wakes up the secondary control unit is a wake-up signal reflecting the ignition status of the vehicle or fastening status of the seat belt, the secondary control unit switches to the sleep state after a predetermined period after the system data is received.

13. A system for managing a seat occupancy status by a passenger, comprising:
 a seat belt sensor provided for each of a plurality of seats to detect a fastened or an unfastened state of a seat belt;
 a pressure detection unit provided for each of the plurality of seats to detect occupancy or non-occupancy of the seat by a passenger and a pressure of a seated passenger;
 a secondary control unit provided for each of the plurality of seats and woken up through radio communication with a vehicle to alert to an unfastened state of the seat belt when the seat belt is unfastened upon determining, by the seat belt sensor, whether the seat belt is fastened, wherein the secondary control unit is configured to harvest electric energy to which the pressure of the seated passenger detected by the pressure detection unit is converted, to transmit system data of the secondary control unit through radio communication, and to switch to a sleep state after transmitting the system data; and
 a primary control unit provided in the vehicle configured to perform the radio communication with each secondary control unit, and to check an abnormality based on reception or non-reception of the system data transmitted by radio from the secondary control unit, wherein the secondary control unit re-transmits status information data when the primary control unit does not receive the system data normally, and the secondary control unit switches to the sleep state when a number of retransmissions exceeds a predetermined number.

14. A control method of a system for managing a seat occupancy status by a passenger, the control method comprising:
 waking up a secondary control unit through radio communication of a vehicle in a sleep state of the secondary control unit;
 alerting, by the secondary control unit, to an unfastened state of a seat belt when the seat belt is unfastened upon determining, by a seat belt sensor provided for each seat, whether the seat belt is fastened and harvesting electric energy to which pressure of a seated passenger detected by a pressure detection unit provided for each seat of a plurality of seats is converted;
 transmitting, by each secondary control unit, system data of the secondary control unit through radio communication;
 receiving, by a primary control unit, the system data transmitted from each secondary control unit and checking an abnormality based on reception and non-reception of the system data; and
 switching the secondary control unit to the sleep state after transmitting the system data, wherein the secondary control unit switches to the sleep state when the primary control unit normally receives the system data.

* * * * *